United States Patent
Smith

(10) Patent No.: US 10,648,088 B2
(45) Date of Patent: May 12, 2020

(54) DOUBLE COUPON REFERENCE CELL AND METHODS OF MAKING SAME

(71) Applicant: Gregory P. Smith, Kettering, OH (US)

(72) Inventor: Gregory P. Smith, Kettering, OH (US)

(73) Assignee: APS Materials, Inc., Dayton, OH (US)

( * ) Notice: Subject to any disclaimer, the term of this patent is extended or adjusted under 35 U.S.C. 154(b) by 316 days.

(21) Appl. No.: 15/375,911

(22) Filed: Dec. 12, 2016

(65) Prior Publication Data

US 2017/0088956 A1 Mar. 30, 2017

Related U.S. Application Data

(62) Division of application No. 14/331,851, filed on Jul. 15, 2014, now Pat. No. 9,550,247.

(Continued)

(51) Int. Cl.
*C23F 13/06* (2006.01)
*C23F 13/22* (2006.01)
(Continued)

(52) U.S. Cl.
CPC ............ *C23F 13/06* (2013.01); *B23K 1/0008* (2013.01); *B23K 1/20* (2013.01); *C23F 13/22* (2013.01);
(Continued)

(58) Field of Classification Search
CPC .......... C23F 13/02; C23F 13/04; C23F 13/06; C23F 2213/10
See application file for complete search history.

(56) References Cited

U.S. PATENT DOCUMENTS

| 2,878,354 A | 3/1959 | Ellison |
| 2,922,085 A | 1/1960 | Drenning et al. |

(Continued)

FOREIGN PATENT DOCUMENTS

| EP | 0085582 | 8/1983 |
| WO | 1999/018261 | 4/1999 |

(Continued)

OTHER PUBLICATIONS

London ("Reference Electrodes") (Year: 2010).*

(Continued)

*Primary Examiner* — Alexander W Keeling
(74) *Attorney, Agent, or Firm* — FisherBroyles, LLP; Susan M. Oiler

(57) ABSTRACT

A cathodic protection device enclosing a reference cell and a conductive media and having two coupon assemblies mounted, facing opposing direction, on an exterior surface thereof is disclosed. The coupon assemblies each have a disc-shaped coupon seated in a jacket and are electrically coupled to a wire. The jacket is generally patch-sized and defines a pocket in a first surface and a groove in a second, opposing surface thereof. The disc-shaped coupon is seated in the pocket and the wire is seated in the groove with the electrical junction therebetween aligned with an aperture connecting the pocket to the groove. A sealing material is used to form a watertight seal between the disc-shaped coupon and the pocket and fills the groove. The device includes a hydrophilic porous member having a first surface in communication with the conductive media and a second surface in communication with an external environment.

13 Claims, 11 Drawing Sheets

Related U.S. Application Data

(60) Provisional application No. 61/847,999, filed on Jul. 18, 2013.

(51) Int. Cl.
*B23K 1/20* (2006.01)
*B23K 1/00* (2006.01)
*B23K 101/36* (2006.01)

(52) U.S. Cl.
CPC ...... *B23K 2101/36* (2018.08); *C23F 2213/32* (2013.01); *Y10T 29/49826* (2015.01); *Y10T 29/49888* (2015.01)

(56) References Cited

U.S. PATENT DOCUMENTS

| | | | |
|---|---|---|---|
| 4,208,264 | A | 6/1980 | Polak et al. |
| 4,285,232 | A * | 8/1981 | Garner ............... G01N 17/02 204/404 |
| 4,928,760 | A * | 5/1990 | Freitas ............... E21B 41/02 166/113 |
| 5,065,893 | A | 11/1991 | Kroon et al. |
| 5,234,029 | A | 8/1993 | Thomas et al. |
| 5,469,048 | A | 11/1995 | Donohue |
| 5,505,826 | A | 4/1996 | Haglin et al. |
| 5,712,559 | A | 1/1998 | Moore et al. |
| 5,791,098 | A | 8/1998 | Thomas |
| 5,814,982 | A | 9/1998 | Thompson et al. |
| 6,060,877 | A * | 5/2000 | Nekoksa ............. G01N 17/02 204/196.06 |
| 6,772,622 | B2 | 8/2004 | Moghissi et al. |
| 7,578,910 | B2 | 8/2009 | Sirola et al. |
| 8,248,088 | B2 | 8/2012 | Spruth et al. |
| 8,366,904 | B2 | 2/2013 | Whitmore |
| 2004/0099982 | A1 | 5/2004 | Sirola et al. |
| 2005/0194576 | A1 | 9/2005 | Sirola et al. |
| 2006/0005967 | A1 | 1/2006 | Sirola et al. |
| 2009/0145748 | A1 | 6/2009 | Bagatavicius et al. |
| 2012/0205256 | A1 | 8/2012 | Catte |
| 2014/0062490 | A1 * | 3/2014 | Neuman ............... C23F 13/22 324/347 |

FOREIGN PATENT DOCUMENTS

| | | |
|---|---|---|
| WO | 1999/024641 | 5/1999 |
| WO | 2009/019717 | 2/2009 |

OTHER PUBLICATIONS

Website featuring "FinkProbe®" by Cott Manufacturing Company, http://www.cottmfg.com/probe.htm (retrieved from the internet on Apr. 30, 2013).

Ansuini et al.; "Field Tests on an Advanced Cathodic Protection Coupon"; Nace International, Paper No. 05039; pp. 1-13 (Apr. 3-7, 2005).

U.S. Non-Final Office Action; U.S. Appl. No. 14/331,851 (dated Mar. 2, 2016).

U.S. Non-Final Office Action; U.S. Appl. No. 14/331,851 (dated Sep. 13, 2016).

* cited by examiner

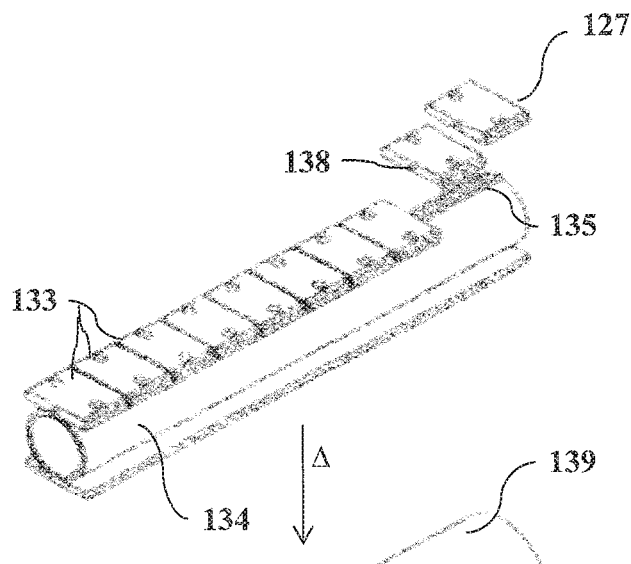
FIG. 4 A
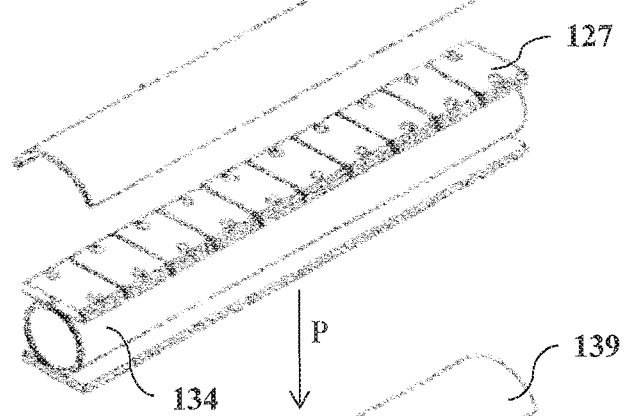
FIG. 4 B
FIG. 4 C
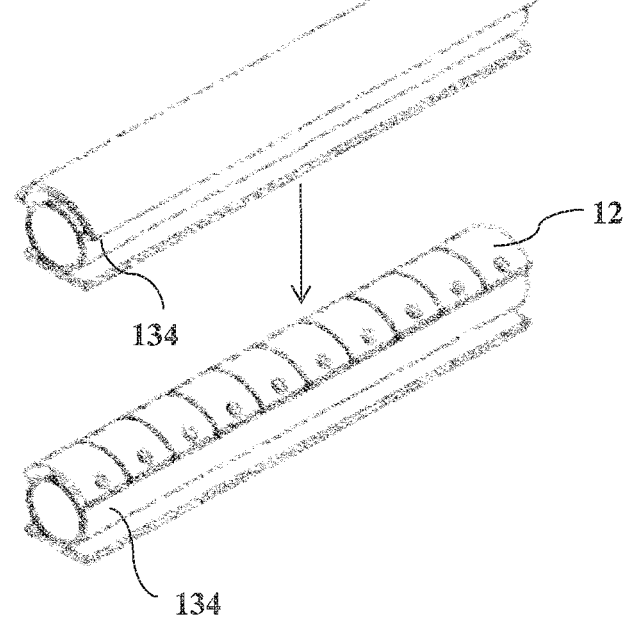
FIG. 4 D

DOUBLE COUPON REFERENCE CELL AND METHODS OF MAKING SAME

RELATED APPLICATIONS

This application is a divisional of U.S. application Ser. No. 14/331,851, filed Jul. 15, 2014, which claims the benefit of U.S. Provisional Application No. 61/847,999, filed Jul. 18, 2013, the entire contents of which are incorporated herein by reference.

TECHNICAL FIELD

The present invention relates to a cathodic protection device that allows for corrosion testing of a system, more particularly, to such a device having dual coupon references to provide accurate measurement of the corrosive nature of a particular environment.

BACKGROUND

Cathodic protection systems are generally in use for corrosion protection of metal structures. Many current cathodic protection devices employ the use of corrosion coupons in order to measure conditions of a particular system, more specifically the corrosivity of tanks and various types of operating equipment. However, these devices are subject to a number of drawbacks, many of which affect the most important objective of the device: providing an accurate measurement of the corrosive nature of a particular environment with respect to a specific type of material.

Various factors relating to both corrosion coupons and cathodic protection devices are relevant in measuring the corrosive nature of a particular environment. With regards to coupons, it is necessary that they are placed in a representative location within the system being monitored such that the location is representative in temperature, pressure, water chemistry, chemical additions, bacterial populations, and solids loading. It is also important that the coupon be electrically isolated from both the cathodic protection device and the system to be monitored in order to prevent galvanic effects that could potentially influence the coupon reading.

The necessary calculation that leads to the measurement of the corrosion rate is based upon the surface area of the coupon. Currently, many of the corrosion coupons in use are in the form of rings, as disclosed in U.S. Pat. No. 4,208,264 (Polak), and thus result in poor surface area for control of the calculation leading to the measurement of corrosion. Therefore, it is advantageous to provide a coupon with adequate exposure of surface area for control of this specific calculation.

In order to expose the coupon to the particular environment measured, it is necessary for coupon placement to be on the outside of the housing unit, which contains the reference cell. Means of placing or mounting the coupons on the housing unit have generally included the use of metallic nuts and/or bolts as fasteners, as disclosed in U.S. Pat. No. 4,928,760 (Freitas). In addition to using nuts and bolts for fastening the coupons to the device, nuts and bolts are also used in fastening wiring and leads to the coupons. Issues arise, however, when the metallic nuts and bolts begin to corrode themselves. Not only is the life of the device decreased, but the corrosion of the nuts and/or bolts begins to interfere with the readings taken by the coupon to calculate the corrosion measurements. Therefore, alternative means to fasten various components of the device are desirable.

Further, the reference cell housing portion of many prior art devices consists of a porous ceramic vessel, an example of which is disclosed in U.S. Pat. No. 4,208,264 (Polak). The porous nature of the ceramic vessel, accompanied with exposure to the outside environment, allows for water from the outside environment to flow through the vessel and into the housing unit. It also allows for penetration of conductive material contained within the housing unit, thus resulting in loss of conductive material to the outside environment. Leakage into the vessel also results when the coupons are not properly sealed within the coupon jacket. Existing methods of sealing the coupon within its housing component result in gaps around the outside of the coupon, thus allowing for water from the outside environment to enter causing further corrosion to the coupon. Therefore, a method of improving the sealing of the coupon within its housing is needed.

Overall, there has not been available to date any device that provides the improvements necessary for providing accurate exposure of coupon surface area, reducing metal galvanic corrosion, eliminating loss of conductive material from within the housing of the device, and sealing and preventing leaks from the housing of the device.

SUMMARY

In one aspect cathodic protection devices are disclosed that include dual coupons constructed to improve the accuracy and reproducibility of measurements of the corrosive nature of a particular environment with respect to a specific type of material. Herein, the coupons included in the cathodic protection device are disc-shaped and provide improved accurate exposure of a known surface area to the outside environment. In one embodiment, the cathodic protection devices include a housing enclosing a reference cell and a conductive media, dual coupons on the exterior of the housing, and a hydrophilic porous member disposed in the housing with one surface thereon in communication with the conductive media and another surface exposed to a surrounding environment to provide measurements of the corrosive nature of the surrounding environment. The cathodic protection devices include the improvement of a disc-shaped coupon within a coupon jack that has a generally patch-sized body that includes a groove recessed into a surface thereof, and a wire lead directly attached to the disc-shaped coupon. The wire lead is sealed within the groove of the coupon jacket with a material that forms a watertight seal, which may also be an electrical insulator. In one embodiment, the material is an electrically insulating material as well as forming the watertight seal. The material may be an epoxy, a plastic, an epoxy-plastic, or combinations thereof.

In another improved embodiment the cathodic protection devices include some or all of the features described above and the improvement of a hydrophilic porous member. The hydrophilicity of the porous member draws a sufficient amount of moisture therein and the presence of this moisture prevents water from the outside environment from being able to flow through the porous member and into the housing, in particular into the conductive media, and also prevents conductive media within the housing unit from flowing out and into the surrounding environment. The hydrophilic porous member is typically less porous than the porous ceramic materials used in the prior art, thus affording the desired objective of preventing the penetration of conductive material contained within the housing unit from flowing out and into the outside environment.

In another aspect, methods of assembling the coupon jacket assembly are disclosed. The coupon jacket assembly is formed by providing one or more blanks of discrete patch-sized units having a groove in a surface thereof, placing the one or more blanks onto a jig having a tongue shaped to fit within the groove, heating the blanks to a sufficient temperature to mold them into a preferred contour, and pressing a mold onto the blanks to impart the preferred contour to the blanks, referred to now as molded blanks. Thereafter, a pocket for holding a disc-shaped coupon is formed in the molded blanks. The pocket includes an aperture connecting the pocket to the groove. Next, the disc-shaped coupon with a wire lead attached thereto has the wire lead threaded through the pocket, an epoxy-plastic welder applied to the inside surface of the pocket and, optionally to the disc-shaped coupon, and is pressed into the pocket of the coupon jacket with the disc-shaped coupon seated in the pocket and the wire lead lying in the groove. The groove is thereafter filled with material for forming a watertight seal and the coupon assembly is mounted to the housing which will house a reference cell and a conductive media.

BRIEF DESCRIPTION OF THE DRAWINGS

FIGS. 4A-4D are perspective views of one embodiment of a method of forming a coupon jacket for the embodiment of FIG. 2.

DETAILED DESCRIPTION

Figure 1:
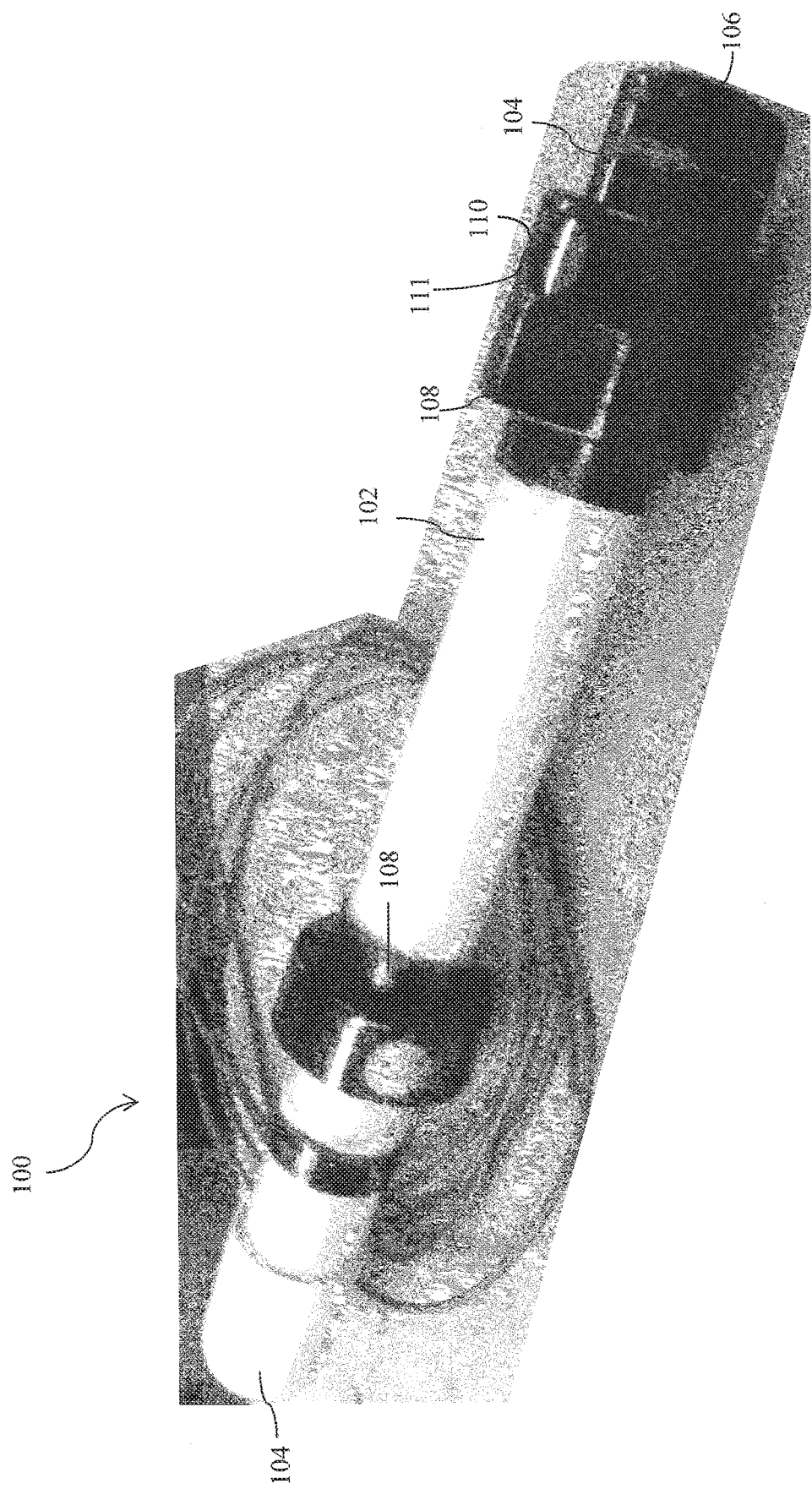
FIG. 1 is a photograph of a prior art cathodic protection device having dual coupon references that are each an annular, cylindrical, metallic ring.

The following detailed description will illustrate the general principles of the invention, examples of which are additionally illustrated in the accompanying drawings. In the drawings, like reference numbers indicate identical or functionally similar elements.

In the past, there have been attempts to measure the conditions of an environment and the corrosivity of tanks and various types of operating equipment through the use of coupon references located on the exterior of an elongate housing of a cathodic protection device, such as shown in the photograph of FIG. 1. However, these cathodic protection devices fail to accurately measure the corrosive nature of the outside environment because the measurements are impacted by flaws in the cathodic protection device itself. Annular coupons or long, narrow coupons have been employed in prior art devices, which result in inaccurate surface area exposure because of gaps between the housing surrounding the coupon and the coupon itself. The gap allows water or other fluid to leak within the housing and a larger surface area is exposed than intended. Additionally, the wire lead is connected by threading directly to the annular coupon, which provides a connection that is highly susceptible to corrosion. These cathodic protection devices fail to provide complete isolation of the coupon connection, which contributes to the inaccuracy of the coupon readings.

FIG. 1 illustrates one embodiment of a partially disassembled prior art cathodic protection device having dual coupon references, generally designated 100, that suffers from the defects described above. The prior art cathodic protection device 100 includes the following components to provide measurements of the corrosive nature of a particular environment: a housing 102 enclosing a reference cell and conductive material and sealed by end caps 104, one of which includes a ceramic plug 106, and having two coupon housings 108 that each enclose a cylindrical coupon reference 110 seated around a portion of the housing 102 (only one of which is shown because the photograph is of a partially disassembled device). This particular embodiment employs the use of screws to attach a wire lead to each cylindrical coupon reference 110 as described above. Further, each cylindrical coupon 110 is not securely contained within the coupon housing components 108 and as such, a gap 111 is created between the coupon housing component 108 and an outside edge of the cylindrical coupon 110. Undesirably, this gap 111 allows water and other fluids to leak into the housing 108. The ceramic plug 106 is made of a highly porous ceramic material, which results in the leakage of conductive material contained within the housing 102 into the outside environment, which is undesirable. Further, the porosity of the ceramic plug 106 allows for water from the outside environment to flow into the elongate housing 118, which is also undesirable. The end caps 104 are meant to seal the housing unit from leaks, however the end caps 104 of this embodiment 100 fail to adequately do so. In particular, the end cap opposite the ceramic plug 106 is glued on in the field after the conductive material and reference cell are placed in the housing 102. The glue provides an inadequate seal thereby reducing the active life of the device.

Figure 2:
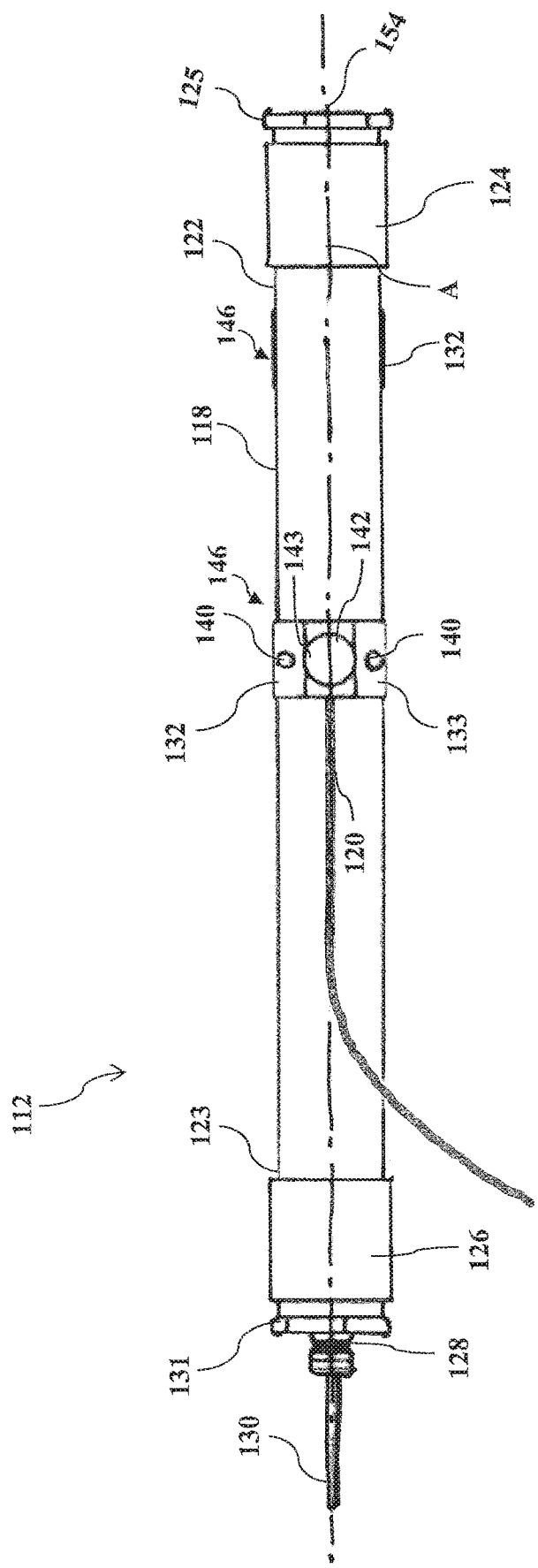
FIG. 2 is a top plan view of one embodiment of an improved cathodic protection device having dual coupon references.
Figure 3:
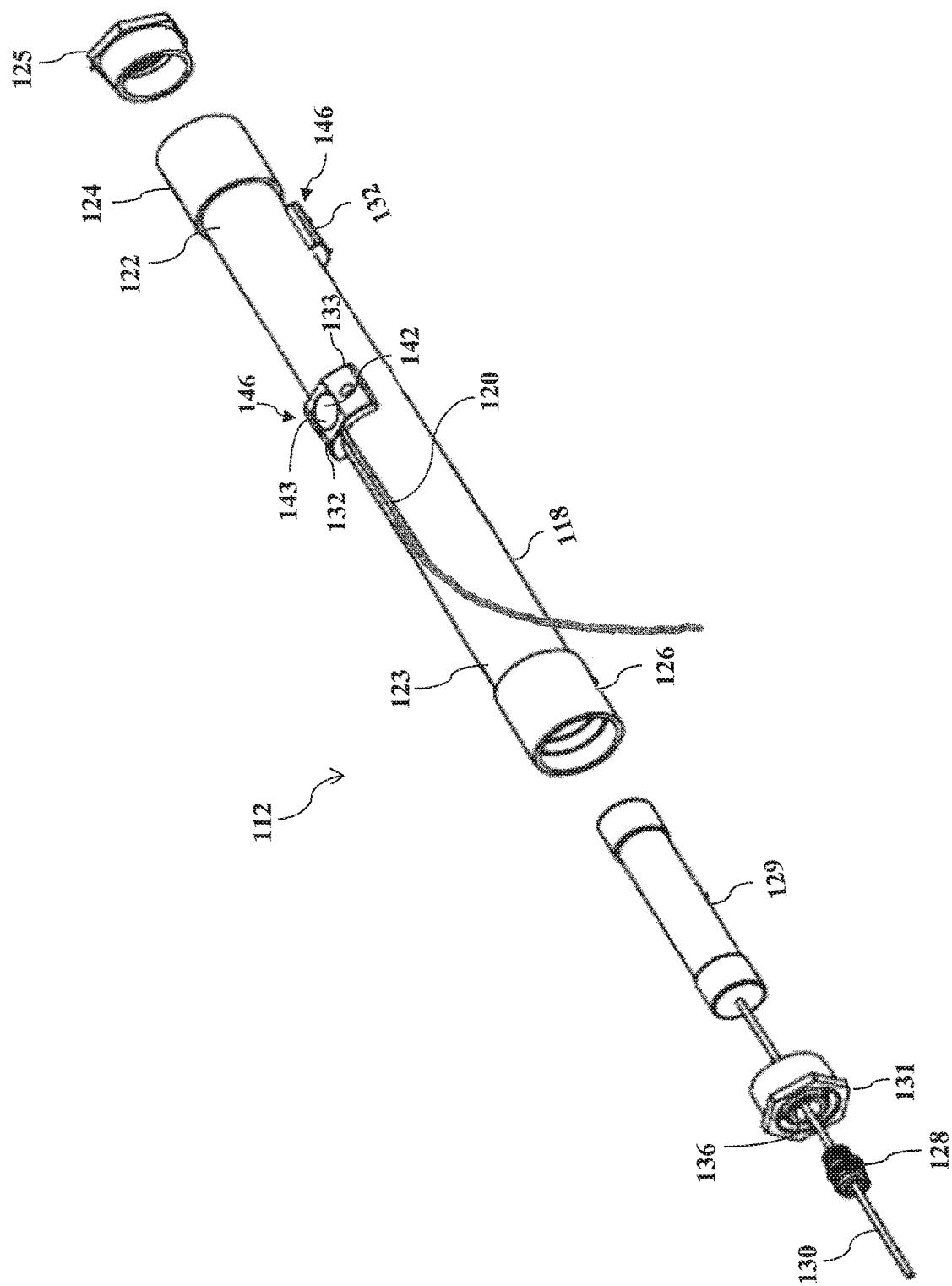
FIG. 3 is an exploded perspective view of the embodiment of FIG. 2.
Figure 10A:
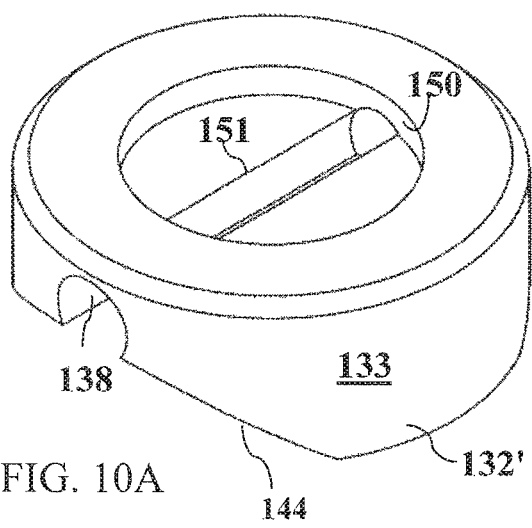
FIGS. 10A and 10B are a perspective top side view and a perspective bottom side view, respectively, of an alternate embodiment of a coupon jacket.
Figure 10B:
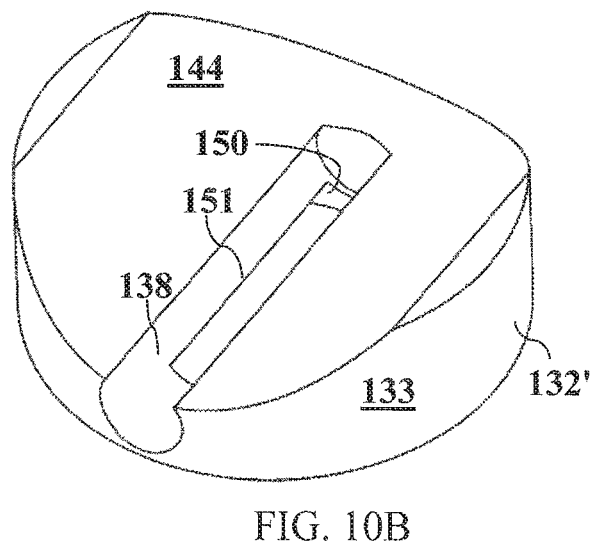

Now referring to FIGS. 2 and 3, one embodiment of the improved cathodic protection device, generally designated by reference number 112, more accurately measures the conditions of an environment through the use of dual disc-shaped coupons 142 within coupon jackets 132 (or 132' in FIGS. 10A and 10B) mounted on the exterior of the elongate housing 118. The improved cathodic protection device 112 overcomes the deficiencies in the prior art described above.

The elongate housing 118 may be made of a dielectric material, such as PVC (but is not limited thereto), and may be a cylindrical tube (but is not limited thereto). The housing unit 118 has a first end 122 and a second end 123. The first end 122 includes a first female adaptor 124 and the second end 123 includes a second female adaptor 126. After the housing unit 118 is filled with a reference electrode 129, shown in FIG. 3, and a conductive media (not shown), the housing is sealed by inserting a first end cap 125 into the first female adaptor 124 and a second end cap 131 into the second female adaptor 126. The first end cap 125 includes a bore having a hydrophilic porous member 154 therein, which is more clearly seen in FIG. 11. The second end cap 131 includes a bore 136 therethrough and has a wire or cable 130, from the reference cell 129, extending through the bore. The wire 130 may include a cord grip 128 that is also received in the bore of the second end cap 131 to seal the wire 130 thereto with a watertight seal. While the embodiment in FIGS. 2 and 3 is shown to include female adaptors 124, 126, these are not required. Instead, the elongate housing 118 may have an integral first end 122 and second end 123 that each form a connector or a seat for receipt of the end caps 125, 131.

In one embodiment, the first end cap 125 and the second end cap 131 are both threaded and the first female adaptor 124 and the second female adaptor 126 are threaded such that the first and second end caps are connected by threading to the respective first and second female adaptors 124, 126. This type of connection is beneficial since it is easy to assemble and it provides a watertight seal that is better than the seal in the prior art device shown in FIG. 1. The seal may also be enhanced by the addition of a water sealant tape or chemical substances applied to the threads. In another embodiment, the opposite configuration is possible, i.e., the female adaptors 124, 126 may be threaded into their respective end caps 125, 131.

The hydrophilic porous member 154 may be or include a ceramic material having a flow rate of about 0.5 ml/hr/cm$^2$ to about 180 ml/hr/cm$^2$ at about 1 atm of pressure. In operation, the hydrophilic porous member draws in moisture and holds it therein, which prevents the conductive media housed within the elongate housing 118 from seeping through the hydrophilic porous member. Additionally, excess moisture from the surrounding environment is prevented from seeping into the housing and into the conductive media. The hydrophilic porous member 154 provides the cathodic protection device 112 with the added advantage that it can be buried vertically in the ground (with the reference cell directed upward toward the surface of the ground and sky or downward opposite thereof) with no worry of leakage of the conductive material therefrom or the seepage of water from the environment into the elongate housing 118. In one embodiment, the hydrophilic porous member 154 is a disc of porous ceramic, such as the ceramic material described above.

Still referring to FIGS. 2 and 3, but also to FIGS. 5-9, the coupon jackets 132 each contain a disc-shaped coupon 142 and are preferably mounted on the exterior surface of the elongate housing 118 oriented 180° apart from one another. Similarly, the coupon jacket 132' in FIGS. 10A and 10B can contain a disc-shaped coupon 142 and be mounted on an exterior surface of the elongate housing 118. Each disc-shaped coupon 142 has a primary surface 143 exposed to the surrounding environment. By referring to the coupon as disc-shaped, there is no intention to limit this to a circular shape even though a circular shape is illustrated in the drawings. The disc-shaped coupon may be an oval, trapezoid, diamond, octagon, etc.

With reference to FIGS. 6-9, each coupon jacket 132, 132' is a generally patch-sized body 133 having a groove 138 in a surface thereof and a pocket 150 recessed into the opposite surface thereof. A patch-sized body is one that is generally small relative to the overall outer surface area of the elongate housing 118 and does not cover a portion of the surface area that extends completely around a transverse cross-sectional portion thereof. For instance, when the housing is a cylindrical shape, the patch-sized body 133 is not a ring about the housing. An aperture 151 connects the pocket 150 to the groove 138. During the methods of making the coupon jackets 132, 132', discussed below, a shape is imparted to the underside 144 (best seen in FIGS. 8-9 and 10B) thereof so that the underside 144 of the coupon jackets 132, 132' conforms to the exterior surface of the housing 118, in particular to the contour thereof. In the embodiment illustrated in the drawings, the housing 118 has a cylindrical exterior surface and the underside of the coupon jacket 132 and coupon jacket 132' is an arc that can seat thereon. Each coupon jacket may also include one or more mounting holes 140 extending through the patch-sized body 133, as seen in FIGS. 2-3 and 6-9.

FIGS. 4A-D illustrate one method of forming the coupon jackets 132 of FIGS. 6-9 to provide the coupon jackets with a contour that matches an exterior surface of the housing 118. As seen in FIG. 4A, a plurality of blanks 127 are provided that may already include mounting holes 140 and are placed on jig 134 (also referred to herein as a mandrel fixture). The mandrel fixture 134 includes a tongue 135 and the blanks include a groove 138 that mates with the tongue 135. After the blanks 127 are attached thereto, the mandrel fixture 134 is placed into an oven, which may have been preheated, at a temperature for a period of time selected to soften the blanks 127 so that they are moldable to the contour/shape of the jig 134. In one embodiment, when the blanks are PVC, the blanks 127 (on the jig 134) are placed in an oven having a temperature of about 200° F. for about 30 minutes. Thereafter, as seen in FIGS. 4B and 4C, a forming tool 139 is placed on top of the blanks 127, while the blanks are still hot, and is pressed down thereon and held in that position, for example by clamps. The attached forming tool 139 is left on the blanks 127 during cooling, for example to room temperature. Thereafter, the forming tool 139 is removed, FIG. 4D, and the molded blanks 127' are removed from the jig 134.

Figure 6:
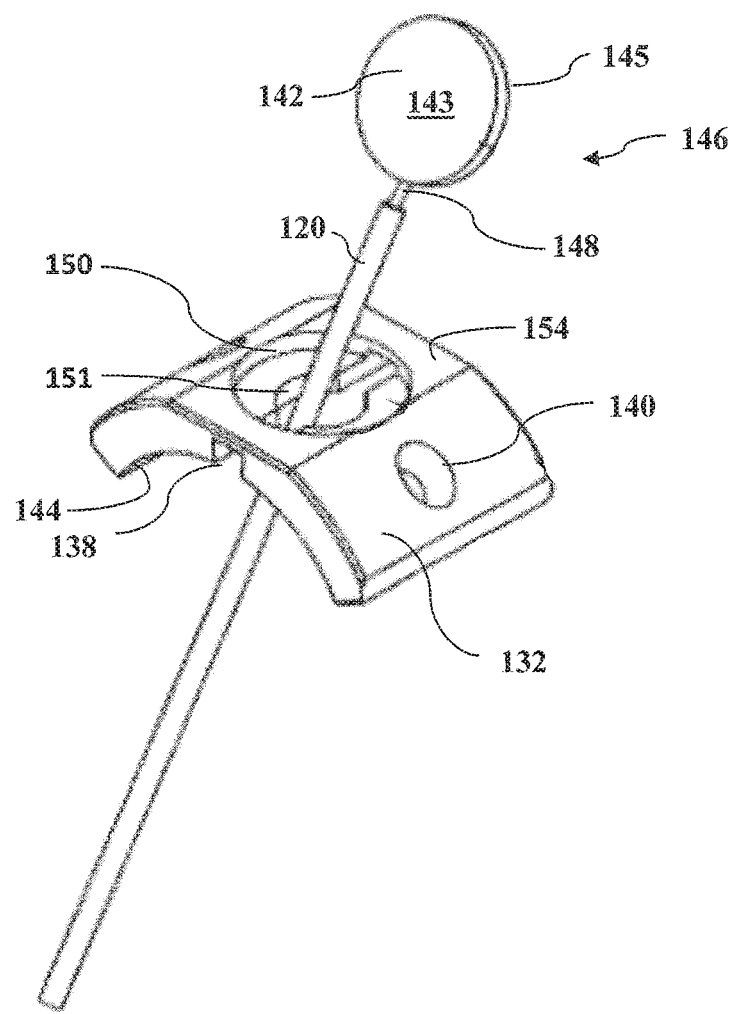
FIG. 6 is a perspective view that illustrates the manner in which the coupon-wire assembly of FIG. 5 is threaded through the aperture in the coupon jacket of FIG. 4D after a pocket and aperture are formed therein.

In the embodiment of FIGS. 4A-D, the forming tool 139 provides a mold for a curved structure to enable formation of coupon jackets 132 that can be seated on the cylindrical housing 118. Then, the molded blanks 127' are processed to form the pocket 150 for the disc-shaped coupon 142 and the aperture 151 within the pocket 150 as shown in FIG. 6. The pocket 150 and aperture 151 may be machined into the piece. Additionally, the portion of the molded blank 127' that receives the pocket 150 may also be planed to have a planar surface 154 before or after the pocket and aperture are formed therein.

In another embodiment, the coupon jacket may alternately be made by cutting a patch-sized component from a stock material and machining the pocket 150, the aperture 151, and the groove 138 therein simultaneously or sequentially. Machining is intended herein to encompass, cutting, etching, drilling, etc. The method also includes shaping the underside 144 to a shape that conforms to an exterior surface of the elongate body 118. For example, the coupon jacket 132' in FIGS. 10A and 10B may be cut from a cylindrical rod of stock material and the pocket 150 aperture 151, groove 138, and underside 144 may be machined therein.

Figure 5:
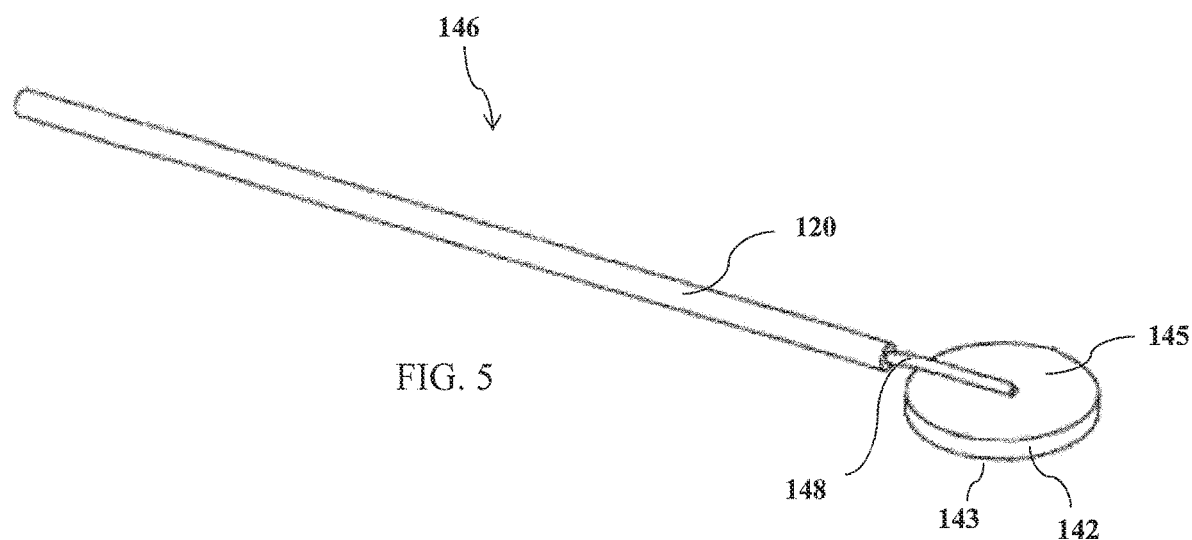
FIG. 5 is a perspective view of one embodiment of a coupon-wire assembly.

A coupon-wire assembly 146 is illustrated in FIG. 5. The coupon-wire assembly 146 includes the disc-shaped coupon 142 having a coupon wire lead 120 directly connected thereto. The coupon wire lead 120 contains a wire 148 soldered or brazed to the back surface 145 of the disc-shaped coupon 142. This is beneficial because it eliminates the use of a screw to connect a wire to the coupon material, which if present is a known point of failure because it is susceptible to corrosion.

Figure 7:
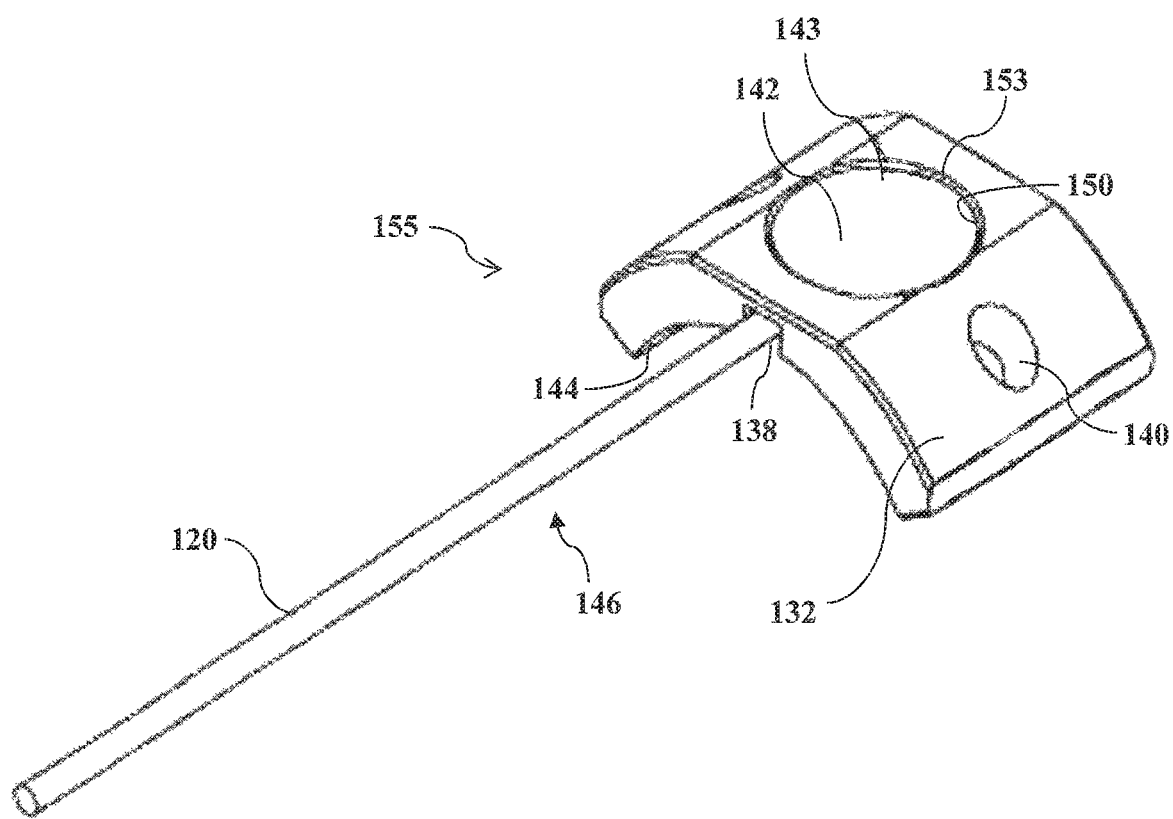
FIG. 7 is a perspective view of the top side of the coupon jacket assembly formed from the method depicted in FIG. 6.

FIG. 6 illustrates the pocket 150 and aperture 151 of the coupon jacket 132 described above, which enables the insertion of the coupon-wire assembly 146 into the coupon jacket 132 so that the disc-shaped coupon 142 can be seated in the pocket 150 as seen in FIG. 7. The wire lead 120, once attached to the disc-shaped coupon 142, is threaded through the pocket 150 and through the aperture 151, and once through, the disc-shaped coupon 142 is pressed into the pocket 150 thereby placing the wire lead 120 into the groove 138 of the coupon jacket. The disc-shaped coupon 142 may be coated with glass tape prior to assembly within the coupon jacket 132. The back side 145 of the disc-shaped coupon 142 is coated with a material for forming a watertight seal and also acts as an insulator. The material may be an epoxy, a plastic, an epoxy-plastic, any other suitable insulating material, and combinations thereof. The surface(s) of the pocket 150 may also be coated with the material for forming the watertight seal.

FIG. 7 illustrates the coupon-wire assembly 146 assembled within the coupon jacket component 132. The disc-shaped coupon 142 is pressed into the pocket 150 in the coupon jacket unit 132 and any excess material for forming a watertight seal is wiped away and/or pressed down into the gap 153 around the edge of the coupon. A sufficient time is allotted for the material for forming a watertight seal to set or cure. In one embodiment about 30 minutes was allotted.

Figure 8:
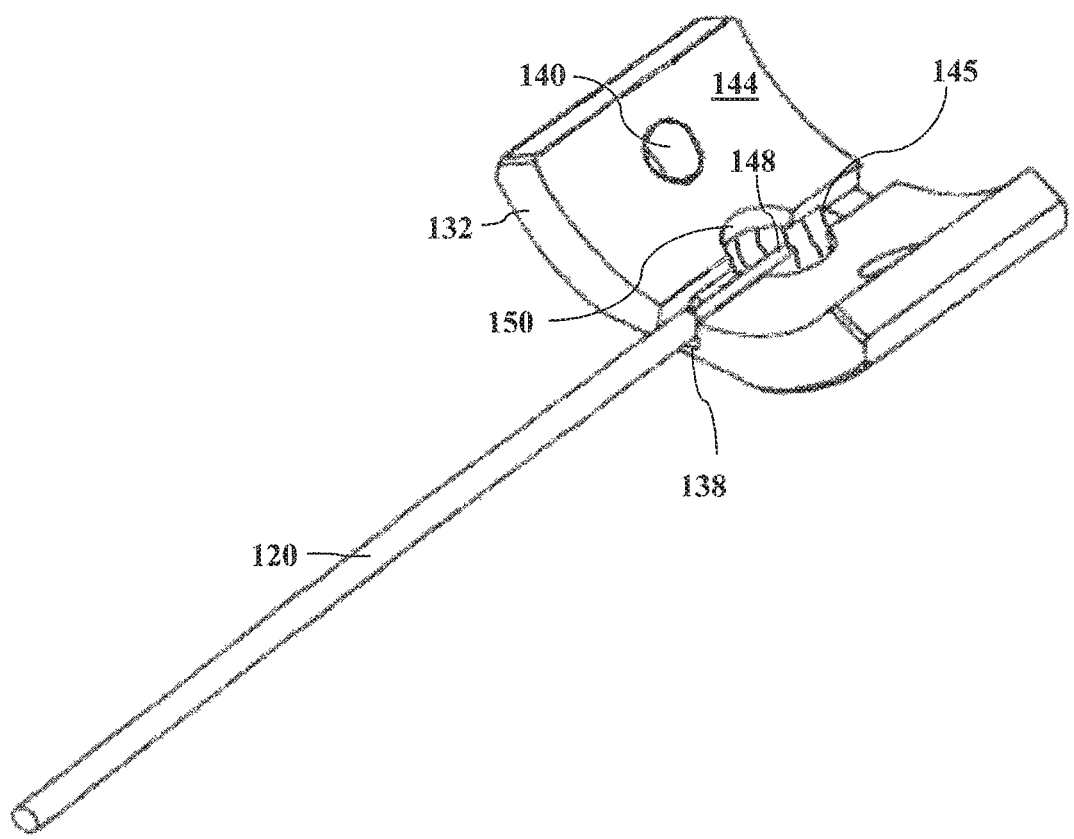
FIG. 8 is a perspective view of the underside of the coupon jacket assembly formed from the method depicted in FIG. 6 prior to filling the cavity.
Figure 9:
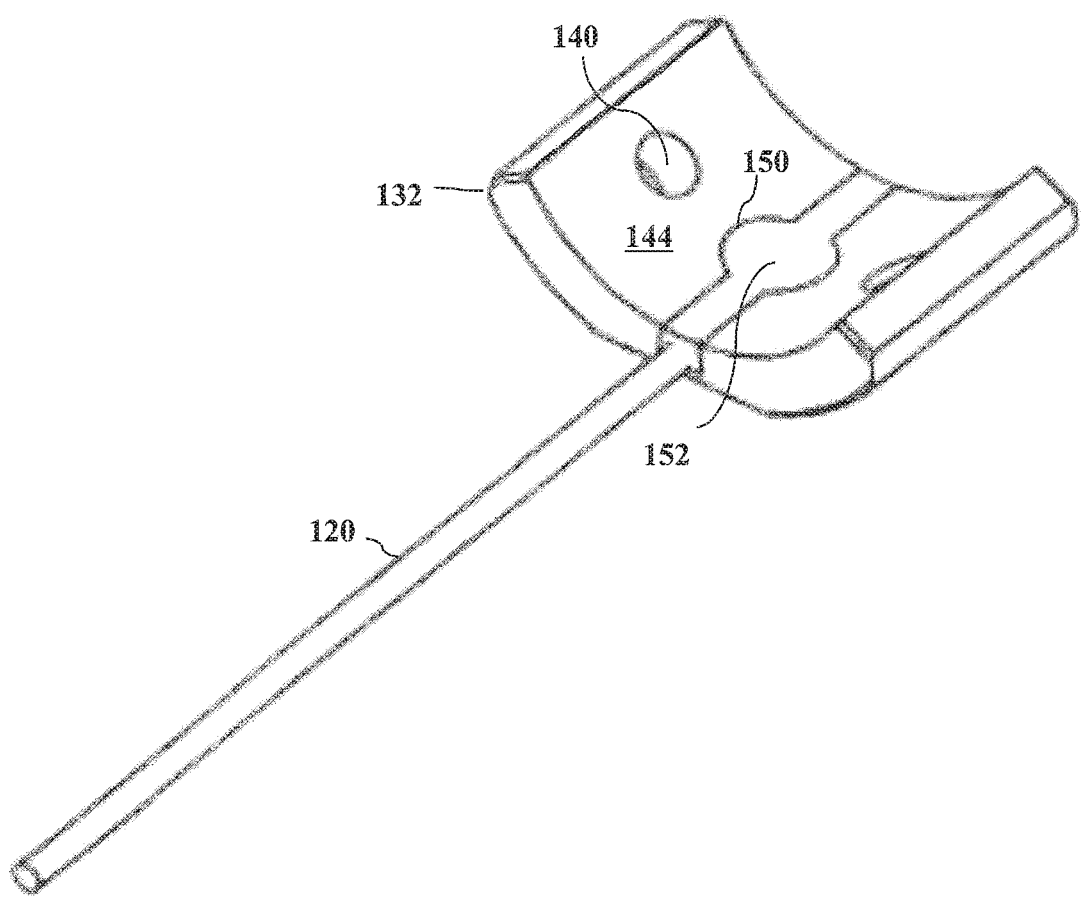
FIG. 9 is a perspective view of the underside of the coupon jacket assembly formed by the method depicted in FIG. 6 after the cavity has been filled.

Thereafter the coupon jacket is turned so that the underside 144 is facing upward and the groove 138 is filled with a material for forming a watertight seal. FIG. 8 illustrates the underside 144 of the coupon jacket unit 132 before the material for forming a watertight seal is placed in the groove 138, and FIG. 9 is an illustration of after. As seen in FIG. 8 the wire lead 120 lies in the groove 138, and FIG. 9 shows that the wire lead 120 and wire 148 within the groove 138 is completely encapsulated by the material for forming a watertight seal. The material that forms the watertight seal is also an electric insulator, as discussed above. The material for forming a watertight seal used to fill the groove 138 should be added in an amount large enough to allow the aperture 151 of the pocket 150 to be overfilled so that the exterior can be wiped and provide a smooth underside 144. Again, sufficient time is allotted for the material for forming the watertight seal to set or cure. In one embodiment, about an hour was allotted. This coupon jacket assembly may be attached to a mandrel, such as a PVC pipe, and wrapped with a layer of double sided glass tape prior to the setting or curing phase. Once cured, the glass tape that was originally placed over the exposed surface 143 of the disc-shaped coupon 142 is removed.

Once the coupon-wire assembly 146 is mounted to the exterior surface of the elongate housing 118, the wire 148 can be wound and secured to the housing until the housing is filled with the conductive media (not shown) and reference cell 129. Once the housing is fully assembled as shown in FIG. 1, the wires 148 from both coupon-wire assemblies 146 are run along the outside of the elongate housing 118 and then along the reference cell wire 130. The wires 148 may be secured by tape, adhesive, clips, latches, cable ties and/or zip-ties to the elongate housing 118 and/or the reference cell wire 130. Accordingly, there are three separate wires for connection of the cathodic protection device 112 to a junction box and thereafter connected to an appropriate component in a system being monitored and to a monitoring station having a datalogger, a computer, a network connection, or the like. As mentioned above, the cathodic protection device is intended to be buried underground. Typically, the device is buried at a location that places at least one of the coupon-wire assemblies 146 generally close to the object to be protected, such as a pipeline or tank. In one embodiment, at least one of the coupon-wire assemblies 146 is approximately six inches from the pipeline or tank, which places the coupon 142 in about the same electrolytic, external environment as the pipeline or tank. Although it is not absolutely necessary, it is considered desirable to place the coupons 142 relatively close to the pipeline or tank to achieve the most accurate measurements.

The coupon 142 is preferably made of the same type of metal as the pipeline or tank for the most accurate results. However, the coupon 142 need only be made of a similar metal material as the pipeline or tank, and thus need not be the exact material to achieve accurate measurements. The coupon 142 is typically not coated with the same protective coating applied to the surface of the pipeline or tank. Due to the electrical conduction through the coupon wire 120, at least one of the coupons 142 is electrically connected to the pipeline or tank. In this manner, the coupon 142 is exposed to the same external environment and receives about the same level of cathodic protection currents as the pipeline or tank.

Figure 11:
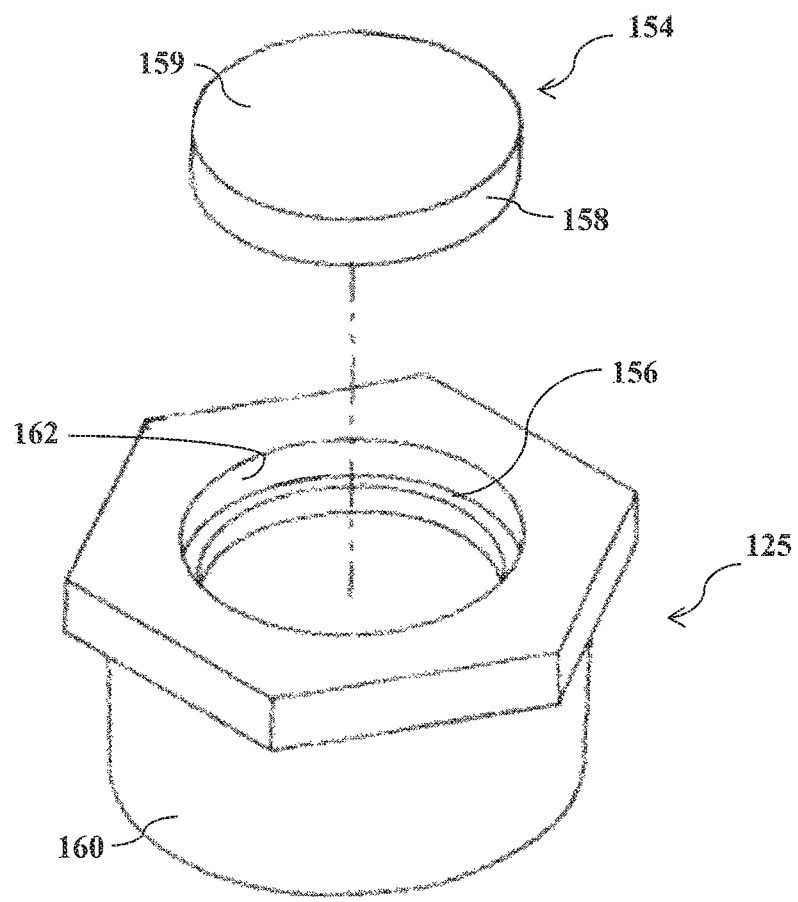
FIG. 11 is a perspective view of inserting a porous member into an end cap.

Referring now to FIG. 11, an exploded view of the hydrophilic porous member 154 and the first end cap 125 is provided. The hydrophilic porous member 154 has an exposed surface 159 facing upward away from the first end cap 125. This exposed surface 159 is masked with a layer of glass tape, which may be a single sided glass tape. Then, a bead of material for forming a watertight seal is applied to the seat 156 within the bore 162 of the first end cap 125. The outer edge 158 of the hydrophilic porous member 154 is covered with material for forming the watertight seal and is pressed into the bore 162 onto the seat 156 so that the material for forming the watertight seal fills any space between the hydrophilic porous member 154 and the bore 162. Thereafter the glass tape mask is removed from the exposed surface 159 of the hydrophilic porous member 154.

What is claimed is:
1. A cathodic protection device comprising:
a housing enclosing a reference cell and a conductive media;
a coupon assembly mounted to an exterior surface of the housing, the coupon assembly comprising:
a jacket comprising a body having a first surface and an opposing second surface with a sidewall therebetween, a pocket recessed in the first surface, a groove in the opposing second surface opposite the pocket, and an aperture through a bottom of the pocket and opening into the groove;
a coupon seated in the pocket;
a wire seated in the groove; and
a junction of the wire to the coupon aligned with the aperture;
wherein orientation of the pocket, the aperture, and the groove relative to one another enables a coupon-wire assembly to be threaded through the pocket and aperture and thereafter the coupon portion of the coupon-wire assembly is seated in the pocket with the wire in the groove.
2. The cathodic protection device of claim 1, wherein the jacket has an outer surface area that is smaller than the overall outer surface area of the housing and does not extend completely around a transverse cross-sectional portion of the housing and the coupon is disc-shaped.

3. The cathodic protection device of claim 1, comprising two coupon assemblies positioned facing opposite directions by being oriented 180 degrees apart from one another.

4. The cathodic protection device of claim 1, wherein the exterior surface of the housing is cylindrical and the opposing second surface of the jacket is shaped to conform to the exterior surface of the housing.

5. The cathodic protection device of claim 1, wherein the junction is a direct connection of the wire to the coupon.

6. The cathodic protection device of claim 1, further comprising a material for forming a watertight seal disposed between the coupon and the pocket and filling the groove about the wire.

7. The cathodic protection device of claim 6, wherein the material for forming a watertight seal is an electrically insulating material.

8. The cathodic protection device of claim 1, wherein the portion of the first surface of the jacket defining the pocket has a planar surface.

9. The cathodic protection device of claim 1, further comprising a hydrophilic porous member disposed in the housing with a first major surface thereof in communication with the conductive media and a second major surface thereof in communication with an external environment surrounding the cathodic protection device; wherein the hydrophilic porous member provides a pathway between the external environment and the conductive media and ultimately to the reference cell within the housing to measure the corrosive nature of the external environment.

10. The cathodic protection device of claim 9, wherein the hydrophilic porous member has a flow rate of about 0.5 ml/hr/cm$^2$ to about 180 ml/hr/cm$^2$ at about 1 atm of pressure.

11. The cathodic protection device of claim 9, wherein the hydrophilic porous member includes a ceramic material.

12. The cathodic protection device of claim 9, wherein the hydrophilic porous member holds an amount of moisture therein that prevents the conductive media from seeping therethrough and prevents excess moisture from the external environment from seeping therethrough into the conductive media.

13. The cathodic protection device of claim 9, wherein the hydrophilic porous member is a disc of ceramic material.

* * * * *